US011445787B2

(12) United States Patent
Roup et al.

(10) Patent No.: US 11,445,787 B2
(45) Date of Patent: *Sep. 20, 2022

(54) METHODS OF MAKING CURVED ZIPPERS

(71) Applicant: Talon Technologies, Inc., Woodland Hills, CA (US)

(72) Inventors: Herman Sydney Roup, Santa Barbara, CA (US); Steven Smith, Peterlee (GB)

(73) Assignee: Talon Technologies, Inc., Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/544,681

(22) Filed: Dec. 7, 2021

(65) Prior Publication Data

US 2022/0087372 A1 Mar. 24, 2022

Related U.S. Application Data

(63) Continuation-in-part of application No. PCT/IB2020/061005, filed on Nov. 23, 2020.

(60) Provisional application No. 62/939,590, filed on Nov. 23, 2019.

(51) Int. Cl.
*B29D 5/00* (2006.01)
*B29D 5/02* (2006.01)
*A44B 19/34* (2006.01)
*A44B 19/40* (2006.01)

(52) U.S. Cl.
CPC ............ *A44B 19/34* (2013.01); *A44B 19/403* (2013.01); *B29D 5/00* (2013.01); *B29D 5/02* (2013.01)

(58) Field of Classification Search
None
See application file for complete search history.

(56) References Cited

U.S. PATENT DOCUMENTS

| | | | |
|---|---|---|---|
| 1,322,650 | A | 11/1919 | Sundback |
| 2,070,753 | A | 2/1937 | Schatzky |
| 2,928,127 | A | 3/1960 | Armstrong |
| 3,003,212 | A | 10/1961 | Emery |
| 3,490,109 | A | 1/1970 | Heimberger |
| 3,541,649 | A | 11/1970 | Sim |
| 3,551,962 | A | 1/1971 | Uhrig |
| 3,725,983 | A | 4/1973 | Selvaggi |
| 3,964,150 | A | 6/1976 | Moertel |
| 3,990,130 | A | 11/1976 | Hattori |

(Continued)

FOREIGN PATENT DOCUMENTS

| | | |
|---|---|---|
| CN | 201782133 U | 4/2011 |
| DE | 7122407 U | 9/1971 |

(Continued)

OTHER PUBLICATIONS

WIPO, International Search Report received in International Application No. PCT/IB2020/061005, dated Mar. 24, 2021, (5p.).

(Continued)

*Primary Examiner* — Niki Bakhtiari
*Assistant Examiner* — John J DeRusso
(74) *Attorney, Agent, or Firm* — Siritzky Law, PLLC

(57) ABSTRACT

A zipper with at least one curve includes a first tape and a second tape, and interlocking elements attached to the first tape and the second tape, wherein the first tape and the second tape are curved, and wherein a curve of at least one of the tapes was caused by compaction of that tape.

22 Claims, 10 Drawing Sheets

(56) References Cited

U.S. PATENT DOCUMENTS

| | | |
|---|---|---|
| 4,058,145 A | 11/1977 | Frohlich et al. |
| 4,112,150 A | 9/1978 | Brown et al. |
| 4,130,917 A | 12/1978 | Shopalovich |
| 4,275,467 A | 6/1981 | Doelter |
| 4,308,644 A | 1/1982 | Brown |
| 4,312,102 A | 1/1982 | Fukuroi |
| 4,348,789 A | 9/1982 | Brown |
| 4,488,338 A | 12/1984 | Takahashi |
| 4,502,190 A | 3/1985 | Inamura |
| 4,513,482 A | 4/1985 | Fukuroi |
| 4,524,493 A | 6/1985 | Inamura |
| 4,580,321 A | 4/1986 | Tanikawa et al. |
| 4,596,065 A | 6/1986 | Tanikawa et al. |
| 4,601,085 A | 7/1986 | Yoshida et al. |
| 4,604,775 A | 8/1986 | Kusayama |
| 4,607,416 A | 8/1986 | Tanikawa et al. |
| 4,658,480 A | 4/1987 | Morioka et al. |
| 4,724,586 A | 2/1988 | Tsubokawa et al. |
| 4,744,133 A | 5/1988 | Tsubata et al. |
| 4,765,038 A | 8/1988 | Kasai |
| 4,780,937 A | 11/1988 | Kusayama |
| 4,817,252 A | 4/1989 | Kusayama |
| 4,823,446 A | 4/1989 | Tsubata et al. |
| 4,825,514 A | 5/1989 | Akeno |
| 4,841,603 A | 6/1989 | Ragni |
| 4,875,258 A | 10/1989 | Goedecke |
| 4,888,859 A | 12/1989 | Horita |
| 4,890,935 A | 1/1990 | Ausnit et al. |
| 4,914,793 A | 4/1990 | Rampolia et al. |
| 4,923,701 A | 5/1990 | VanErden |
| 4,941,238 A | 7/1990 | Clark |
| 4,942,648 A | 7/1990 | Yoshida |
| 5,008,986 A | 4/1991 | Laudet et al. |
| 5,020,194 A | 6/1991 | Herrington et al. |
| 5,020,247 A | 6/1991 | Barret et al. |
| 5,062,186 A | 11/1991 | Rampolla et al. |
| 5,065,491 A | 11/1991 | Takada |
| 5,129,127 A | 7/1992 | Hamatani |
| 5,231,736 A | 8/1993 | Hohenocker et al. |
| 5,253,395 A | 10/1993 | Yano |
| 5,293,672 A | 3/1994 | Tominaga et al. |
| 5,351,369 A | 10/1994 | Swain |
| 5,386,616 A | 2/1995 | Norvell |
| 5,437,888 A | 8/1995 | Ortlieb |
| 5,444,898 A | 8/1995 | Norvell |
| 5,924,172 A | 7/1999 | Klein |
| 5,991,980 A | 11/1999 | Meager |
| 6,006,691 A | 12/1999 | Wilce |
| 6,035,496 A | 3/2000 | Germani |
| 6,092,266 A | 7/2000 | Lee |
| 6,105,214 A | 8/2000 | Press |
| 6,223,349 B1 | 5/2001 | Roiser |
| 6,343,408 B1 | 2/2002 | Neugebauer |
| 6,363,531 B1 | 4/2002 | Quinn |
| 6,363,553 B1 | 4/2002 | Baumgartel et al. |
| 6,427,294 B1 | 8/2002 | Shibaike et al. |
| 6,438,757 B1 | 8/2002 | Quinn |
| 6,497,014 B2 | 12/2002 | Neugebauer |
| 6,519,826 B1 | 2/2003 | Ortlieb |
| 6,571,432 B1 | 6/2003 | Rindle |
| 6,622,351 B2 | 9/2003 | Takasawa |
| 6,651,254 B1 | 11/2003 | Chang |
| 6,681,455 B2 | 1/2004 | Ichikawa |
| 6,691,326 B2 | 2/2004 | Hexels |
| 6,691,383 B2 | 2/2004 | Linton |
| 6,721,999 B2 | 4/2004 | Meager |
| 6,936,121 B2 | 8/2005 | Butz |
| 7,137,177 B2 | 11/2006 | Fujii et al. |
| 7,213,305 B2 | 5/2007 | Stolmeier et al. |
| 7,293,333 B2 | 11/2007 | Stenhall |
| 7,337,506 B2 | 3/2008 | Kusayama et al. |
| 7,392,572 B2 | 7/2008 | Cossutti |
| 7,416,397 B2 | 8/2008 | Kusayama et al. |
| 7,441,312 B2 | 10/2008 | Bernasconi |
| 7,500,291 B2 | 3/2009 | Matsumoto |
| 7,568,270 B2 | 8/2009 | Cossutti |
| 7,591,051 B2 | 9/2009 | Kusayama et al. |
| 7,624,482 B2 | 12/2009 | Kusayama et al. |
| 7,703,182 B2 | 4/2010 | Bonaglia |
| 7,832,065 B2 | 11/2010 | Meager |
| 7,934,305 B2 | 5/2011 | Cossutti |
| 7,954,209 B2 | 6/2011 | Chen |
| 8,011,070 B2 | 9/2011 | Miyazaki |
| 8,104,147 B2 | 1/2012 | Peano |
| 8,156,588 B2 | 4/2012 | Svoboda |
| 8,166,619 B2 | 5/2012 | Cossutti et al. |
| 8,327,509 B2 | 12/2012 | Kusayama |
| 8,375,528 B2 | 2/2013 | Takazawa et al. |
| 8,397,353 B2 | 3/2013 | Chou |
| 8,402,613 B2 | 3/2013 | Williams et al. |
| 8,438,706 B2 | 5/2013 | Brightman |
| 8,464,404 B2 | 6/2013 | Takazawa et al. |
| 8,484,810 B2 | 7/2013 | Chou |
| 8,646,156 B2 | 2/2014 | Brightman |
| 8,667,652 B2 | 3/2014 | Thomas et al. |
| 8,689,408 B2 | 4/2014 | Chou |
| 8,695,178 B2 | 4/2014 | Yoneshima et al. |
| 8,756,768 B2 | 6/2014 | Williams et al. |
| 8,806,724 B2 | 8/2014 | Kusayama |
| 8,869,356 B2 | 10/2014 | Nir |
| 8,938,860 B2 | 1/2015 | Suckow et al. |
| 9,015,908 B2 | 4/2015 | Matsumoto et al. |
| 9,055,790 B2 | 6/2015 | Tanaka et al. |
| 9,089,187 B2 | 7/2015 | Takano et al. |
| 9,138,033 B2 | 9/2015 | Kojima et al. |
| 9,173,458 B2 | 11/2015 | Wang |
| 9,237,781 B2 | 1/2016 | Shimono |
| 9,237,783 B2 | 1/2016 | La Rocca et al. |
| 9,247,791 B2 | 2/2016 | Cowin et al. |
| 9,265,308 B2 | 2/2016 | Matsuda et al. |
| 9,290,305 B2 | 3/2016 | Stefanek et al. |
| 9,295,307 B2 | 3/2016 | Tominaga et al. |
| 9,301,579 B2 | 4/2016 | Fujii et al. |
| 9,314,069 B2 | 4/2016 | Takazawa |
| 9,456,664 B2 | 10/2016 | Tanaka |
| 9,474,341 B2 | 10/2016 | Chou |
| 9,538,817 B2 | 1/2017 | Ogura et al. |
| 9,545,134 B1 | 1/2017 | Tan |
| 9,572,406 B2 | 2/2017 | Tanaka et al. |
| 9,622,551 B2 | 4/2017 | Gonda et al. |
| 9,642,420 B2 | 5/2017 | McLachlan |
| 9,661,902 B2 | 5/2017 | Mikuma et al. |
| 9,717,310 B1 | 8/2017 | Chung |
| 9,750,314 B2 | 9/2017 | Ausnit et al. |
| 9,756,879 B2 | 9/2017 | Roup |
| 9,840,037 B2 | 12/2017 | Roup |
| 9,872,522 B2 | 1/2018 | Roup |
| 9,888,748 B2 | 2/2018 | Smith |
| 9,896,241 B2 | 2/2018 | Anzini et al. |
| 9,955,741 B2 | 5/2018 | Roup |
| 10,016,027 B2 | 7/2018 | Yoneoka |
| 10,080,405 B2 | 9/2018 | Cheng |
| 10,130,149 B1 | 11/2018 | Liping |
| 10,144,160 B2 | 12/2018 | Cheng |
| 10,220,601 B2 | 3/2019 | Roup et al. |
| 10,264,858 B2 | 4/2019 | Chen |
| 10,285,457 B2 | 5/2019 | Roup |
| 10,362,839 B2 | 7/2019 | Minato et al. |
| 10,369,765 B2 | 8/2019 | Konaka et al. |
| 10,375,999 B2 | 8/2019 | Roup |
| 10,421,222 B2 | 9/2019 | Cheng |
| 10,426,233 B2 | 10/2019 | Numata et al. |
| 10,433,620 B2 | 10/2019 | Kameyama et al. |
| 10,464,252 B2 | 11/2019 | Roup |
| 10,492,572 B1 | 12/2019 | Omote et al. |
| 10,531,712 B2 | 1/2020 | Ogura |
| 10,562,247 B2 | 2/2020 | Hsieh |
| 10,575,599 B2 | 3/2020 | Cheng |
| 10,602,811 B2 | 3/2020 | Adachi |
| 10,602,812 B2 | 3/2020 | Gordon |
| 10,800,081 B2 | 10/2020 | Chou |
| 10,828,864 B2 | 11/2020 | Roup et al. |
| 10,863,801 B2 | 12/2020 | Hosokawa et al. |
| 10,959,497 B2 | 3/2021 | Zhang |

(56) References Cited

U.S. PATENT DOCUMENTS

| | | |
|---|---|---|
| 11,006,679 B2 | 5/2021 | Roup |
| 11,006,702 B2 | 5/2021 | Martinson et al. |
| 11,033,081 B2 | 6/2021 | Myerscough et al. |
| 11,034,130 B2 | 6/2021 | Roup et al. |
| 11,109,650 B2 | 9/2021 | Martinson et al. |
| 11,116,291 B2 | 9/2021 | Myerscough et al. |
| 11,134,756 B2 | 10/2021 | Kayahara et al. |
| 11,154,096 B2 | 10/2021 | Roup |
| 2001/0013158 A1 | 8/2001 | Yamaguchi et al. |
| 2002/0017010 A1 | 2/2002 | Neugebauer |
| 2005/0235466 A1 | 10/2005 | Segawa et al. |
| 2006/0101632 A1 | 5/2006 | Yang |
| 2007/0214614 A1 | 9/2007 | Okot |
| 2008/0248146 A1 | 10/2008 | Yang |
| 2008/0264335 A1 | 10/2008 | Roup |
| 2008/0268157 A1 | 10/2008 | Roup |
| 2009/0144948 A1 | 6/2009 | Jeon |
| 2010/0125982 A1 | 5/2010 | Chou |
| 2011/0289738 A1 | 12/2011 | Wang |
| 2012/0042433 A1* | 2/2012 | Damon ................. H01F 7/0252 2/69 |
| 2013/0125351 A1 | 5/2013 | Chou |
| 2013/0125352 A1 | 5/2013 | Chou |
| 2013/0205548 A1 | 8/2013 | Wehner |
| 2014/0366336 A1 | 12/2014 | Chung |
| 2015/0113697 A1 | 4/2015 | Roup |
| 2016/0113334 A1 | 4/2016 | Roup |
| 2016/0255920 A1 | 9/2016 | La Rocca et al. |
| 2016/0366949 A1 | 12/2016 | Roup |
| 2017/0127770 A1 | 5/2017 | Mert |
| 2017/0253016 A1 | 9/2017 | Roup et al. |
| 2017/0367412 A1 | 12/2017 | Roup |
| 2018/0104887 A1 | 4/2018 | Roup |
| 2018/0140022 A1 | 5/2018 | Roup |
| 2018/0235291 A1 | 8/2018 | Roup |
| 2019/0335824 A1 | 11/2019 | Roup |
| 2019/0387808 A1 | 12/2019 | Roup |
| 2020/0114567 A1 | 4/2020 | Roup |
| 2020/0180263 A1 | 6/2020 | Roup et al. |
| 2021/0052017 A1 | 2/2021 | Roup |
| 2021/0101363 A1 | 4/2021 | Roup et al. |
| 2021/0204616 A1 | 7/2021 | Roup |
| 2021/0337888 A1 | 11/2021 | Roup |
| 2021/0362466 A1 | 11/2021 | Roup et al. |
| 2022/0104590 A1* | 4/2022 | Roup ..................... A44B 19/32 |

FOREIGN PATENT DOCUMENTS

| | | |
|---|---|---|
| JP | 4472851 B2 | 6/2010 |
| WO | 2006000086 A2 | 1/2006 |
| WO | 2017117285 A1 | 7/2017 |
| WO | 2021100021 | 5/2021 |

OTHER PUBLICATIONS

WIPO, International Written Opinion received in International Application No. PCT/IB2020/061005, dated Mar. 24, 2021, (15p.).

USPTO, Non-final Office action for U.S. Appl. No. 17/539,570, dated Feb. 10, 2022. (13 pages).

* cited by examiner

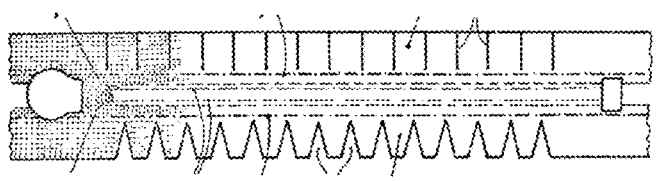
FIG. 1D
(PRIOR ART)
FIG. 1E
(PRIOR ART)
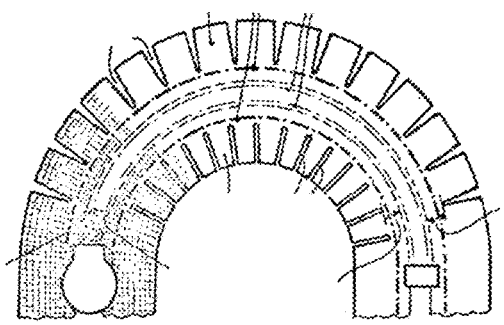
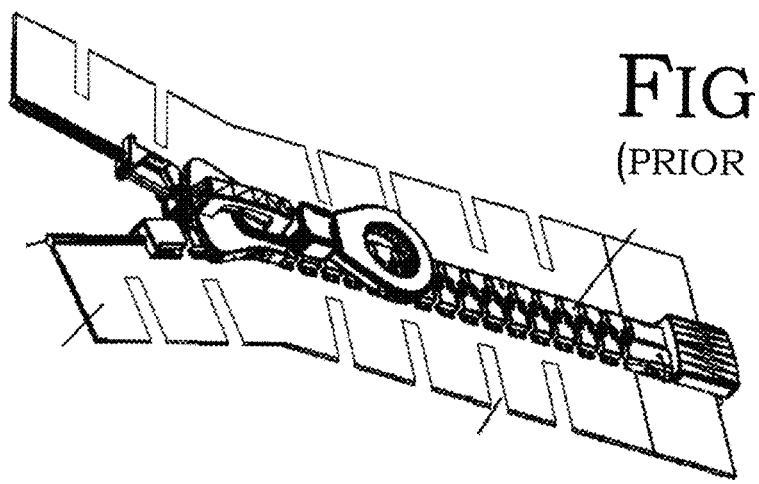
FIG. 1F
(PRIOR ART)
FIG. 1G
(PRIOR ART)
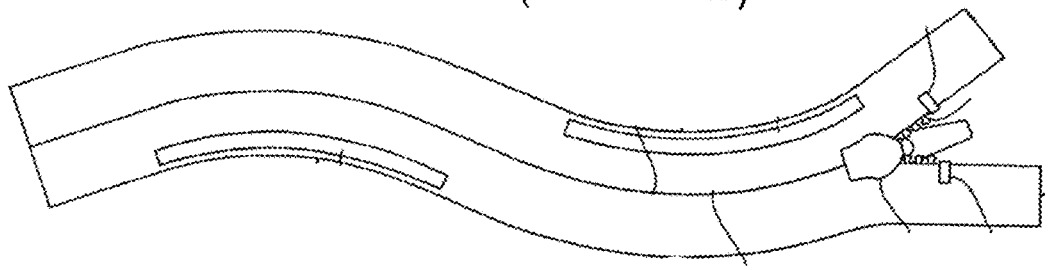

FIG. 5A
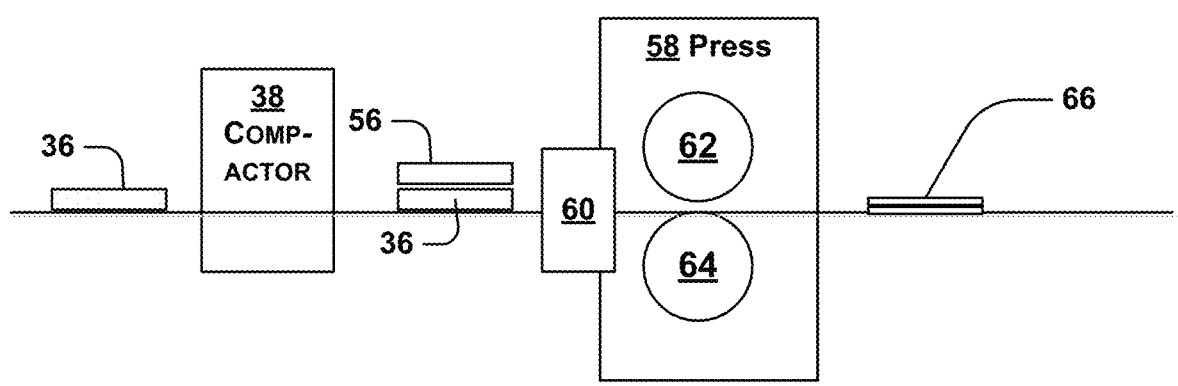
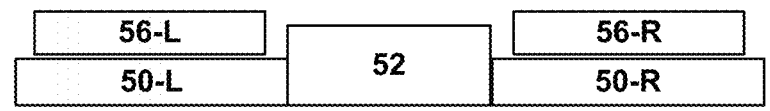
FIG. 5B

METHODS OF MAKING CURVED ZIPPERS

RELATED APPLICATIONS

This application is a continuation of PCT/IB2020/061005, filed Nov. 23, 2020, published as WO/2021/100021, which claims the benefit of U.S. provisional patent application No. 62/939,590, filed Nov. 23, 2019, the entire contents of both of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This invention relates generally to zippers and, more particularly, in some aspects, to curved zippers and to zippers that stretch and recover.

BACKGROUND

Zippers are ubiquitous and have long been used to fasten or otherwise secure items such as jackets, luggage, pockets, and other types of products. A typical zipper may include a slider configured with two face-to-face rows of elements or teeth or interlocking spirals. The rows of elements are typically connected to a tape or the like, and, as the slider is moved along the tape in one direction, the two rows of teeth may pass through the slider, and the teeth may be interlocked, resulting in a combined zipper chain. As the slider is moved along the tape in the opposite direction, the rows of teeth separate. In this way, as is well known, an item configured with the zipper may be fastened or unfastened.

Conventionally, the tapes are made of a fabric or substrate such as cotton or polyester or nylon. The interlocking elements (e.g., teeth or a coil) may be made up of many things, including brass, steel, stainless steel, nylon, or poly.

The inventor has realized that conventional zippers have various problems, including:
(1) The tapes may shrink, making an attached item (e.g., a garment) look unsightly. Sometimes the tapes may not shrink in the same amount as the garment fabric to which it is attached, making the garment look unsightly.
(2) Zippers do not stretch.
(3) Zippers do not stretch and recover.
(4) Zippers generally cannot curve, so they are attached to items (e.g., garments or bags or the like) "standing up"—in a straight line.

Curved zippers are known in principle from the art.

Some approaches use cuts and notches in the carrier tapes in the region of the desired bend. Examples of these are shown in FIGS. 1A-1F (see FIG. 2a of US20130205548A1 in FIG. 1A; FIG. 4 of WO2006000086A2 in FIG. 1B; FIG. 6 of WO2017117285A1 in FIG. 1C; FIGS. 1 and 2 of DE7122407 in FIGS. 1D-1E; and FIG. 1 of CN201782133U in FIG. 1F).

The "cuts and notches" approach has various drawbacks, including that the cuts and notches create weak locations in the carrier tapes.

Another known approach to curved zippers, shown in U.S. Pat. No. 8,011,070, attaches "stretchable members" to the zipper tapes in various locations "as a reinforcement member for the fastener tape to maintain its curved shape". U.S. Pat. No. 8,011,070 col. 7, lines 57-58 (see also FIG. 2 of U.S. Pat. No. 8,011,070 reproduced in part in FIG. 1G hereof). As described in U.S. Pat. No. 8,011,070, the so-called stretchable member has to be held (sewn) in place in its deformed (curved) state; otherwise it will be restored to its original state. In another configuration in U.S. Pat. No. 8,011,070, "the stretchable member . . . may be formed by coating the tape surface . . . of the fastener tape . . . with a rubber made belt material . . . continuously in the length direction of the fastener tape . . . in a belt-like formation . . . . The belt material . . . is applied to the fastener tape . . . by coating in a state in which the rubber is heated to be softened, so that the rubber invades in between fibers of the fastener tape . . . and fixed integrally with the fastener tape . . . . Thus, no adhesive layer is needed to fix the belt material . . . to the fastener tape." U.S. Pat. No. 8,011,070, col. 8, lines 55-64.

A method of producing a curved zipper is known from U.S. Pat. No. 5,065,491A, in which a carrier tape of solvent-swelling fibers is produced so that the fibers swell when a solvent is applied to the carrier tape, and the tape (and zipper) is shaped into the desired curved configuration. The shape is not retained permanently. The method is not suitable for production by machine, and it is expensive.

Accordingly, it is desirable and an object hereof to provide a curved zipper that maintains its curve, even when not connected to a garment or other device.

It is also desirable and an object hereof to provide a curved zipper that does not have weak attachment points and thus maintains its strength and integrity along its length.

It is further desirable and an object hereof to provide a zipper that does not have excessive shrinkage.

It is further desirable and an object hereof to provide a zipper with uniform shrinkage.

It is further desirable and an object hereof to provide a zipper with stretch properties.

It is further desirable and an object hereof to provide a zipper with stretch and recovery properties.

SUMMARY

The present invention is specified in the claims and the below description. The following summary is exemplary and not limiting. Presently preferred embodiments are particularly specified in the dependent claims and the description of various embodiments.

Zippers That Deal with too Much Shrinkage

One general aspect includes a zipper with two tapes, where at least one of the two tapes is formed from a compacted fabric. The zipper also includes multiple interlocking elements (e.g., teeth) connected to each of the two tapes, where interlocking elements from each tape of the two tapes may join with interlocking elements of the other of the two tapes.

Implementations may include one or more of the following features, alone or in combination(s):
  the zipper where the fabric is selected from cotton or polyester or nylon; and/or the zipper where the tapes were compacted before being connected to the interlocking elements; and/or the zipper where the interlocking elements may include teeth or a coil; and/or the zipper where the interlocking elements are formed from brass or steel or stainless steel or nylon; and/or the zipper where the two tapes have different degrees of compaction.

Zippers That Deal with too Little Shrinkage

Another general aspect includes a garment may include a garment fabric and a zipper attached to one or more portions of the garment fabric.

Implementations may include one or more of the following features, alone or in combination(s):

the garment where the garment fabric is preshrunk by compaction; and/or the garment where the zipper may include two zipper tapes, and where the zipper tapes have a first shrinkage and where the garment fabric has a second shrinkage larger than the first shrinkage; and/or the garment where the zipper may include two zipper tapes, and where the zipper tapes have a first and second shrinkage and where the garment fabric has a third shrinkage larger than the first and second shrinkages; and/or the garment where the garment fabric was preshrunk such that the shrinkage of the preshrunk garment fabric is substantially equal to the shrinkage of the zipper tapes.

Another general aspect includes a method of making a garment. The method of making also includes providing a zipper having two zipper tapes, where the zipper tapes have a first shrinkage, and providing a garment fabric where the garment fabric has a second shrinkage larger than the first shrinkage. The method also includes compacting the garment fabric to produce a compacted garment fabric, where the compacted garment fabric has a third shrinkage, where the third shrinkage is substantially equal to the first shrinkage. The method also includes connecting the zipper tapes to the compacted garment fabric.

Implementations may include washing the garment.

Zippers That Stretch

Another general aspect includes a zipper having two tapes, each formed from a compacted fabric. The zipper also includes multiple interlocking elements (e.g., teeth) attached to the two tapes after the fabric was compacted, where interlocking elements from each tape may join with interlocking elements of the other tape.

Implementations may include one or more of the following features, alone or in combination(s):

where the compacted fabric was compacted to remove all or substantially all shrinkage of the fabric; and/or where the tapes have different degrees of compaction.

Another general aspect includes a method of making a zipper, including compacting two tapes to form two compacted tapes; and then attaching interlocking elements to the two tapes.

Implementations may include one or more of the following features, alone or in combination(s):

where the two tapes are compacted to remove substantially all of their shrinkage; and/or where the tapes have different degrees of compaction.

Another general aspect includes a method of making a zipper, including attaching interlocking elements to two tapes; and then compacting the two tapes.

Implementations may include one or more of the following features, alone or in combination(s):

the method where compaction of the two tapes uses a compactor; and/or the method where the compactor includes at least one drum; and/or the method where the drum has a notch or groove to allow the zipper's interlocking elements to pass without pressure from the drum while the tapes on either side of the interlocking elements are being compacted; and/or where the tapes have different degrees of compaction; and/or the method where the drum is heated.

Another general aspect includes a drum for a compactor, where the drum has a notch or groove to allow a zipper's interlocking elements to pass without pressure from the drum while tapes on either side of the zipper's interlocking elements are being compacted by the drum.

Zippers That Stretch and Recover

Another general aspect includes a zipper including two tapes, each formed from a compacted fabric, where at least one of the two tapes has a fusible substrate fused with the compacted fabric. The zipper also includes multiple interlocking elements connected to each of the two tapes, where interlocking elements from each tape may join with interlocking elements of the other tape.

Implementations may include one or more of the following features, alone or in combination(s):

the zipper where both of the tapes include the fusible substrate fused with the compacted fabric; and/or the zipper where at least one of the two tapes may include the fusible substrate fused with the compacted fabric along substantially a length of the tapes; and/or the zipper where interlocking elements were attached to the two tapes after the fabric was compacted; and/or the zipper where interlocking elements were attached to the two tapes after the fusible substrate was fused with the compacted fabric; and/or where the tapes have different degrees of compaction.

Another general aspect includes a method of making a zipper. The method includes compacting a tape to form a compacted tape and fusing a fusible substrate to the compacted tape. The method also includes attaching interlocking elements to the compacted tape.

Implementations may include one or more of the following features, alone or in combination(s):

the method may include compacting a second tape to form a second compacted tape; fusing the fusible substrate to the second compacted tape; and attaching the interlocking elements to the second compacted tape; and/or the method where the tape is compacted using a heated drum; and/or where the tapes have different degrees of compaction.

Another general aspect includes a method of making a zipper, including attaching a first tape to a first side of a zipper chain and attaching a second tape to a second side of the zipper chain; and then compacting the first tape and the second tape; and then fusing a fusible substrate with the first tape.

Implementations may include fusing the fusible substrate with the second tape.

Zippers That Curve

Another general aspect includes a zipper having a first tape and a second tape and interlocking elements attached to the first tape and the second tape, where the first tape and the second tape are curved, and wherein a curve of the first tape was caused by compaction of the first tape.

Implementations may include one or more of the following features, alone or in combination(s):
the zipper where a curve of the second tape was caused by compaction of the second tape; and/or
the zipper where the second tape is woven with a second edge portion having a tighter weave than the rest of the second tape; and/or
the zipper where the first tape was compacted using a compactor; and/or
the zipper where the first tape is woven with a first edge portion having a tighter weave than the rest of the first tape; and/or
the zipper where interlocking elements were attached to the first tape after the first tape was curved; and/or
the zipper where interlocking elements were attached to the second tape after the second tape was curved; and/or
the zipper where interlocking elements were attached to the first tape before the first tape was curved; and/or
the zipper where interlocking elements were attached to the second tape before the second tape was curved; and/or
the zipper where at least a portion of the first tape has stretch; and/or
the zipper where at least a portion of the first tape has stretch and recovery properties; and/or
the zipper where at least a portion of the first tape is fused with a fusible substrate; and/or
the zipper where the first and second tapes have different degrees of curvature;
the zipper where less than the entire zipper is curved; and/or
the zipper where the zipper has more than one curve.

Another general aspect includes a method of making a zipper, including providing a first tape, the first tape woven with a first edge portion having a tighter weave than the rest of the first tape. The making also includes compacting a first tape to form a curved first tape. The making also includes attaching interlocking elements to the curved first tape.

Implementations may include one or more of the following features, alone or in combination(s):
the method may include attaching a curved second tape to the interlocking elements; and/or
the method where the curved second tape was formed by compaction; and/or
the method where the first and second tapes have different degrees of curvature; and/or
the method may include after the compacting, fusing a fusible substrate to the first tape.

Yet another general aspect includes a product including a zipper assembly according to any of the previous embodiments. The product may be, e.g., a garment, clothing, footwear (shoes, boots, etc.), an item of luggage, or a sports item. Non-limiting examples of products include, without limitation, bags, pencil cases, backpacks, computer/laptop cases, luggage, zip-up portfolio case, zip-up storage bins for toys, sleeping bags, tents, boat covers, children make up/toiletry bags, lunch bags, hats with zipper pockets, toys, toy clothing, etc.

Below is an exemplary list of zipper embodiments, method/process embodiments, and garment embodiments. The zipper embodiments will be indicated with a letter "Z". Whenever such embodiments are referred to, this will be done by referring to "Z" embodiments. The garment embodiments will be indicated with a letter "G". Whenever such embodiments are referred to, this will be done by referring to "G" embodiments. The method embodiments will be indicated with a letter "M". Whenever such embodiments are referred to, this will be done by referring to "M" embodiments. Drum embodiments will be indicated with a letter "DR". Whenever such embodiments are referred to, this will be done by referring to "DR" embodiments.

Z1. A zipper comprising:
two tapes; and
multiple interlocking elements connected to each of the two tapes,
wherein interlocking elements from each tape of the two tapes may join with interlocking elements of the other of the two tapes, and
wherein at least one of the two tapes is formed from a compacted fabric.

Z2. The zipper of embodiment Z1, wherein the fabric is selected from cotton or polyester or nylon.

Z3. The zipper of embodiment(s) Z1 or Z2, wherein the tapes were compacted after being connected to the interlocking elements.

Z3'. The zipper of embodiment(s) Z1 or Z2, wherein the tapes were compacted prior to being connected to the interlocking elements.

Z4. The zipper of embodiment(s) Z1-Z3', wherein the tapes have different degrees of compaction.

Z5. The zipper of any of embodiment(s) Z1-Z4, wherein the interlocking elements comprise teeth or a coil.

Z6. The zipper of any of embodiment(s) Z1-Z5, wherein the interlocking elements are formed from brass or steel or stainless steel or nylon.

G7. A garment comprising a garment fabric and a zipper attached to one or more portions of the garment fabric, wherein at least some of the garment fabric is preshrunk before attachment to the zipper.

G8. The garment of embodiment(s) G7, wherein the garment fabric is preshrunk by compaction.

G9. The garment of embodiment(s) G7 or G8, wherein the zipper comprises two zipper tapes, and wherein the zipper tapes have a first shrinkage and wherein the garment fabric has a second shrinkage larger than said first shrinkage.

G10. The garment of any of embodiment(s) G76-G9, wherein the garment fabric was preshrunk such that the shrinkage of the preshrunk garment fabric is substantially equal to the shrinkage of the zipper tapes.

M11. A method of making a garment, the method comprising:
providing a zipper having two zipper tapes, wherein the zipper tapes have a first shrinkage;
providing a garment fabric wherein the garment fabric has a second shrinkage larger than said first shrinkage;
compacting the garment fabric to produce a compacted garment fabric, wherein the compacted garment fabric has a third shrinkage, wherein said third shrinkage is substantially equal to the first shrinkage; and connecting the zipper tapes to the compacted garment fabric.

M12. The method of embodiment(s) M11 further comprising washing the garment.

Z13. A zipper comprising:
two tapes, each formed from a compacted fabric; and
multiple interlocking elements connected to each of the two tapes,
wherein interlocking elements from each tape may join with interlocking elements of the other tape, and
wherein interlocking elements were attached to the two tapes after the fabric was compacted.

Z13'. A zipper comprising:
two tapes, each formed from a compacted fabric; and
multiple interlocking elements connected to each of the two tapes,
wherein interlocking elements from each tape may join with interlocking elements of the other tape, and
wherein interlocking elements were attached to the two tapes before the fabric was compacted.

Z14. A zipper according to embodiment(s) Z13 or Z13', wherein the compacted fabric was compacted to remove all or substantially all shrinkage of the fabric.

M15. A method of making a zipper, the method comprising:
compacting two tapes to form two compacted tapes; and
attaching interlocking elements to the two tapes.

M16. A method of making a zipper, the method comprising:
attaching interlocking elements to two tapes; and then
compacting the two tapes.

M17. The method of embodiment(s) M15 or M16, wherein the two tapes are compacted to remove substantially all of their shrinkage.

M18. The method of any of embodiment(s) M15-M17, wherein compaction of the two tapes uses a compactor.

M19. The method of any of embodiment(s) M15-M18, wherein the two tapes have different degrees of compaction.

M20. The method of embodiment(s) M19, wherein the compactor includes at least one drum.

M21. The method of embodiment(s) M20, wherein the at least one drum has a notch or groove to allow a zipper's interlocking elements to pass without pressure from the at least one drum while the tapes on either side of the interlocking elements are being compacted by the at least one drum.

M22. The method of embodiment(s) M20-M21, wherein the at least one drum is heated.

DR23. A drum for a compactor, the at least one drum comprising a notch or groove to allow a zipper's interlocking elements to pass without pressure from the at least one drum while tapes on either side of the zipper's interlocking elements and attached to the zipper are being compacted by the at least one drum.

Z24. A zipper comprising:
two tapes, each formed from a compacted fabric, wherein at least one of the two tapes comprises a fusible substrate fused with the compacted fabric; and
multiple interlocking elements connected to each of the two tapes, wherein interlocking elements from each tape may join with interlocking elements of the other tape.

Z25. The zipper of embodiment(s) Z24, wherein the two tapes have different degrees of compaction.

Z26. The zipper of embodiment(s) Z24-Z25, wherein both of the two tapes comprise said fusible substrate fused with the compacted fabric.

Z27. The zipper of embodiment(s) Z24-Z26, wherein at least one of the two tapes comprises said fusible substrate fused with the compacted fabric along substantially a length of the tapes.

Z28. The zipper of any of embodiment(s) Z24-Z27, wherein the interlocking elements were attached to the two tapes after the fabric was compacted.

Z29. The zipper of any of embodiment(s) Z24-Z28, wherein the interlocking elements were attached to the two tapes after the fusible substrate was fused with the compacted fabric.

M30. A method of making a zipper, the method comprising:
compacting a tape to form a compacted tape;
fusing a fusible substrate to the compacted tape; and
attaching interlocking elements to the compacted tape.

M31. The method of embodiment(s) M30, further comprising:
compacting a second tape to form a second compacted tape;
fusing said fusible substrate to the second compacted tape; and
attaching interlocking elements to the second compacted tape.

M32. The method of embodiment(s) M30 or M31, wherein the tape is compacted using a heated drum.

M33. A method of making a zipper, the method comprising:
attaching interlocking elements to a first tape and to a second tape; and then
compacting the first tape and the second tape; and then
fusing a fusible substrate with the first tape.

M34. The method of embodiment(s) M33 further comprising:
fusing said fusible substrate with the second tape.

Z35. A zipper comprising:
a first tape and a second tape; and
interlocking elements attached to the first tape and the second tape,
wherein the first tape and the second tape are curved, and
wherein a curve of the first tape was caused by compaction of the first tape.

Z36. The zipper of embodiment(s) Z35, wherein the tapes have different degrees of compaction.

Z37. The zipper of embodiment(s) Z35-Z36, wherein a curve of the second tape was caused by compaction of the second tape.

Z38. The zipper of embodiment(s) Z35-Z37, wherein the first tape was compacted using a heated press.

Z39. The zipper of any of embodiment(s) Z35-Z38, wherein the first tape is woven with a first edge portion having a tighter weave than the rest of the first tape.

Z40. The zipper of any of embodiment(s) Z35-Z39, wherein the second tape is woven with a second edge portion having a tighter weave than the rest of the second tape.

Z41. The zipper of any of embodiment(s) Z35-Z40, wherein the interlocking elements were attached to the first tape before the first tape was curved.

Z41'. The zipper of any of embodiment(s) Z35-Z40, wherein the interlocking elements were attached to the first tape after the first tape was curved.

Z42. The zipper of any of embodiment(s) Z35-Z41', wherein the interlocking elements were attached to the second tape before the second tape was curved.

Z42'. The zipper of any of embodiment(s) Z35-Z41', wherein the interlocking elements were attached to the second tape after the second tape was curved.

Z43. The zipper of any of embodiment(s) Z35-Z42', wherein at least a portion of the first tape has stretch.

Z44. The zipper of any of embodiment(s) Z35-Z43, wherein at least a portion of the first tape has stretch and recovery properties.

Z45. The zipper of any of embodiment(s) Z35-Z44, wherein at least a portion of the first tape is fused with a fusible substrate.

Z46. The zipper of any of embodiment(s) Z35-Z45, wherein less than the entire zipper is curved.

Z47. The zipper of any of embodiment(s) Z35-Z46, wherein the zipper has more than one curve.

Z48. The zipper of any of embodiment(s) Z35-Z47, wherein the first tape has a different degree of curvature than the second tape.

M49. A method of making a zipper, the method comprising:
providing a first tape, said first tape woven with a first edge portion having a tighter weave than the rest of the first tape;
compacting a first tape to form a curved first tape; and
attaching interlocking elements to the curved first tape.

M49'. A method of making a zipper, the method comprising:
providing a first tape, said first tape woven with a first edge portion having a tighter weave than the rest of the first tape;
attaching interlocking elements to the curved first tape; and
compacting a first tape to form a curved first tape.

M50. The method of embodiment(s) M49-M49', further comprising: attaching a curved second tape to the interlocking elements.

M51. The method of embodiment(s) M49-M50, wherein the curved second tape was formed by compaction.

M52. The method of any of embodiment(s) M49-M51, further comprising after said compacting, fusing a fusible substrate to the first tape.

M53. The method of any of embodiment(s) M49-M52, wherein the first tape has a different degree of curvature than the second tape.

Below are product embodiments indicated with the letter "P".

P54. A product comprising a zipper according to any of the previous zipper embodiments.

P55. The product of embodiment(s) P54, wherein the product is selected from:
a garment, footwear, an item of luggage, an item of sports equipment, boat covers, bags, pencil cases, backpacks, computer/laptop cases, luggage, zip-up portfolio case, zip-up storage bins for toys, sleeping bags, tents, children make up/toiletry bags, lunch bags, hats with zipper pockets, toys, toy clothing.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1A-1G show prior approaches to curved zippers (FIGS. 1A-1G show parts of drawings from other patent documents, and, to avoid confusion, the original drawings have been cropped and edited to remove reference numbers used in those patent documents);

FIGS. 4A-4B, 5A-5B, and 6A-6E show aspects of zippers and making zippers according to exemplary embodiments hereof.

DETAILED DESCRIPTION OF THE PRESENTLY PREFERRED EXEMPLARY EMBODIMENTS

Zippers according to exemplary embodiments hereof are described here.

The following detailed description is not intended to limit the current invention. Alternate embodiments and variations of the subject matter described herein will be apparent to those skilled in the art.

Background

Figure 2:
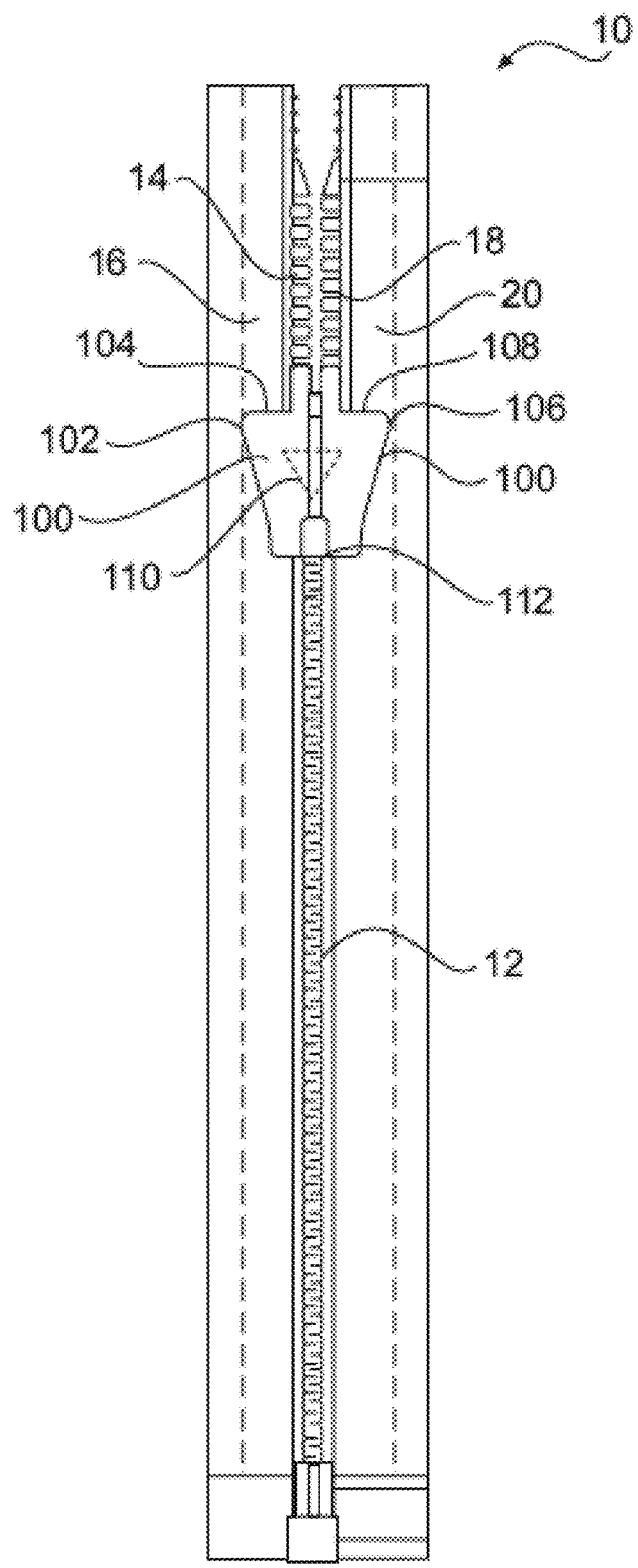
FIG. 2 shows aspects of a zipper.

As shown in FIG. 2, and as is well known, a zipper 10 (also referred to as a zipper assembly) includes a zipper chain 12 comprising two individual rows interlock elements, e.g., teeth (left row of teeth 14 attached to left tape 16 and right row of teeth 18 attached to right tape 20) that, when interlocked, may form the combined zipper chain 12. A slider 100 may be configured and positioned such that the left row of teeth 14 pass into and through a left-side channel 102 in the slider's top left shoulder 104, and the right row of teeth 18 pass into and through a right-side channel 106 of the slider's top right shoulder 108.

Figure 1A:
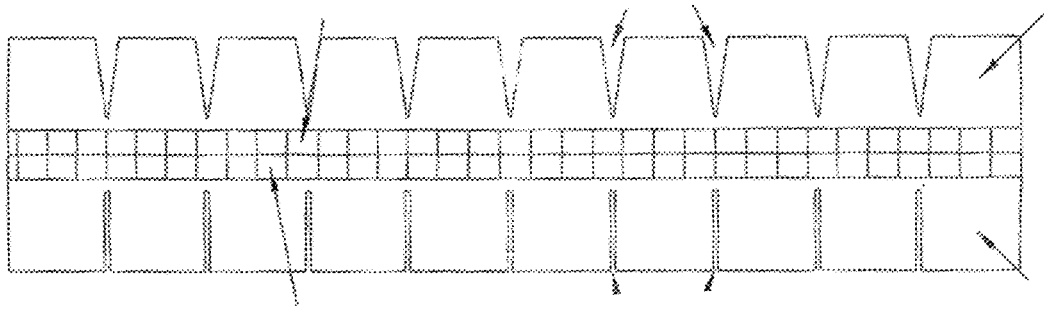
Figure 1B:
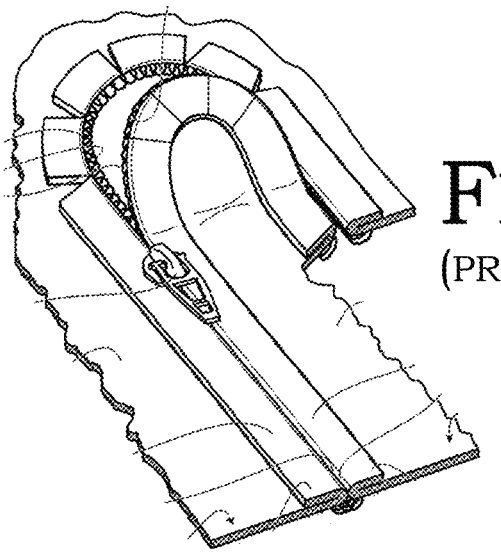
Figure 1C:
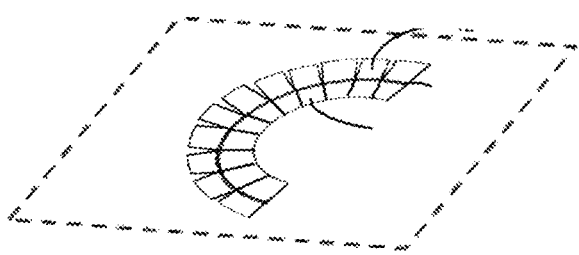

The left and right side channels 102, 106 may combine below piece 110 within the body cavity of slider 100 (generally hidden from view and depicted with dashed lines in FIG. 1) to form a mouth 112. In operation, and as is known, as the left row of teeth 14 and the right row of teeth 18 pass through mouth 112, they may interlock to form zipper chain 12.

As is also well known, the slider 100 may be moved from one end of the zipper to the other. As the slider is moved in one direction, the rows of teeth (the left row of teeth 14 and right row of teeth 18) may continue to be interlocked as they pass through slider 100 to form the length of the combined zipper chain 12. As slider 100 is moved in the other direction, it may contact the joined zipper chain 12 at a junction between the left row of teeth 14 and the right row of teeth 18 to force them apart, separate them from one another, and generally unlock the two rows of teeth 14, 18. This separation and unlocking may result in two separate and individual rows of teeth 14, 18. This allows zipper chain 12 to be combined to fasten the left and right sides together and separated to unfasten them. In this way, the zipper 10 may be used as a fastener for jackets, pockets, luggage, and other products.

The interlocking elements may be connected directly to the left and right tapes (e.g., in the case where they are metal teeth or the like), or they may be attached to a separate chain which is then attached to the left and right tapes.

Description

Zippers That Deal with too Much Shrinkage

In order to deal with too much shrinkage, the tapes may be compacted, e.g., using heat and pressure to remove some or all of the shrinkage.

Figure 3:
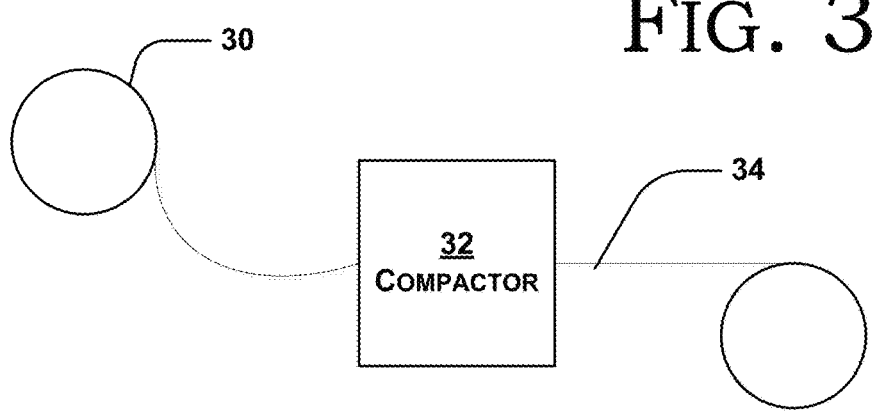
FIG. 3 shows aspects of making zippers according to exemplary embodiments hereof.

For example, as shown in FIG. 3, a spool of tape 30 may be fed into a compactor 32 to produce compacted tape 34 with some or substantially all of the shrinkage in the tape removed. The compactor 32 may include a drum or the like. Those of skill in the art will understand, upon reading this description, that the amount of compaction of the tape 30 by the compactor 32 will depend on the type and/or cut of material used for the tape 30, and the temperature, speed, and pressure of the compactor 32.

The compacted tape 34 may be spooled. A zipper may then be formed using the compacted tape 34.

Zippers That Deal with too Little Shrinkage

Consider the case where a zipper is attached to a fabric of an item (e.g., a garment) and where the fabric shrinks at a higher rate than the tapes. For example, the fabric may shrink about 15 percent, whereas the zipper's tapes only shrink, say 2-5%. In those cases, after washing, the garment will pucker along the zipper garment connection.

To deal with this case, preshrink the garment fabric by an amount that leaves little or no shrinkage, in any case no more than the shrinkage of the zipper tapes. The fabric may be preshrunk by compaction. The zipper tapes are attached to the garment after the fabric has been shrunk/compacted.

So, in the example above, the garment fabric is preshrunk by at least 10-15%.

The garment fabric, when attached to the zipper, may appear puckered, as the garment body may still be bigger. However, after washing the body of the garment, the connected fabric and zipper will have shrunk and will lay flat.

Zippers That Stretch

In order to allow zippers to stretch, the tapes may be compacted to remove all or substantially all of their shrinkage (e.g., as shown above). Then the teeth may be applied to the compacted tapes. In this way, the resulting zipper will be able to stretch the amount compacted.

In an alternate approach, the zipper may be formed with pre- or un-compacted tapes, and then the fully-formed zipper may be compacted. The resulting zipper will stretch by the amount compacted.

Figure 4A:
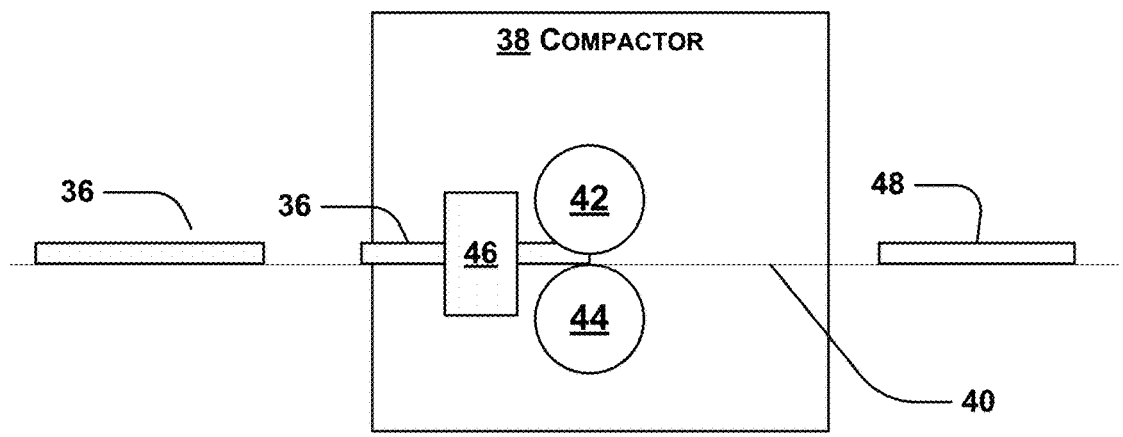

An exemplary approach to compacting the zippers is shown in FIG. 4A, in which assembled zippers 36 (with teeth attached to tapes) are fed into a compactor 38, e.g., on a belt 40 or the like. The compactor 38 may include one or two drums 42, 44. Since the zipper 36 is already at least partially assembled, one or both of the drums 42, 44 are cut or grooved to allow the zipper's rail (teeth) to pass through uncompacted, while the tapes on either side of the rail are compacted.

Figure 4B:
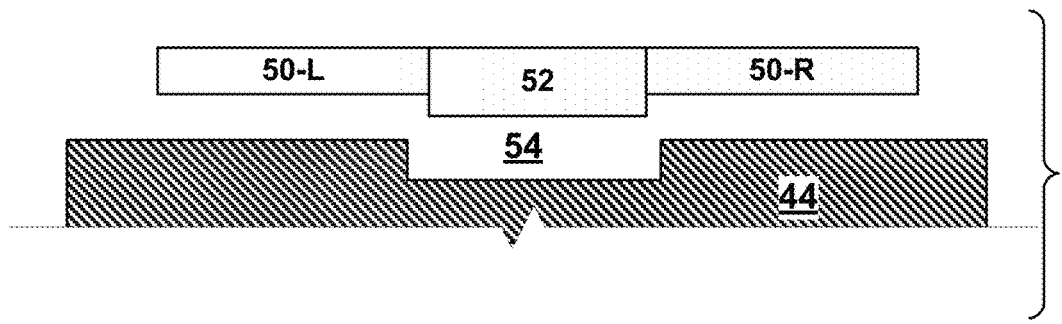

As shown in FIG. 4B, zipper includes a left tape 50-L and a right tape 50-R, connected to the rail or teeth elements 52. As noted, in order to prevent compaction of the teeth elements 52, the drum 44 may include a notch or groove or cut 54 to allow the teeth elements 52 to pass through uncompressed. A similar notch or the like may be incorporated into the drum 42, in which case the zippers 36 may be fed into the compactor 38 with the teeth elements facing up or down.

One or both of the drums 42, 44 may be grooved and/or coated, at least in the regions that will come into contact with the tapes.

The compactor 38 may include a suitable guide mechanism 46 to correctly and accurately position the zippers 36 as the pass between the drums 42, 44. The compacted zipper 48 may then be attached to an item (e.g., a garment or the like).

In order to achieve compaction of the zippers 36, one or both of the drums may be heated. Those of skill in the art will understand, upon reading this description, that the amount of compaction of the tape by the compactor 38 will depend on the type and/or cut of material used for the tape, and the temperature, speed, and pressure of the compactor 38. The compressed zipper 48 will be able to stretch the amount compacted.

Zippers That Stretch and Recover

In order to allow zippers to stretch and recover, the tapes may be compacted to remove their shrinkage. Then a fusible (e.g., a 2-way fusible substrate) may be applied to the back of the tapes to provide memory to the tapes.

For example, as shown in FIG. 5A, a zipper 36 may be passed through a compactor 38, e.g., as described above, to remove shrinkage of the tapes. Then a fusible substrate (or fusible) 56 may be applied to the back of the tapes (50-L, 50-R) to provide a memory and allow it to recover after it is stretched. The zipper 36 and the fusible substrate 56 are fed into a heating press 58, preferably using a guide 60. The heating press 58 may include two rollers 62, 64. The result is a zipper 66 in which the tapes have been compacted (by compactor 38) and then be fused with a fusible substrate (by heating press 58).

The speed, temperature, and pressure of the heating press 58 depend on the type of fabric used for the tapes and on the type of fusible substrate 56 being used.

The speed, temperature, and pressure of the heating press 58 need not be the same as those of the compactor 38, as the compactor 38 is used to compact the tape fabric, whereas the heating press 58 is used to fuse the fusible substrate 56 to the compacted tape fabric.

As shown in FIG. 5B, the fusible substrate 56 is preferably in two parts, namely fusible substrate 56-L for the left tape 50-L and fusible substrate 56-R for the right tape 50-R.

The fusible substrate is preferably a 2-way stretchable fusible.

As an alternative, before the zipper is assembled, the tapes may be compacted (to remove shrinkage) and then fused with a fusible to provide memory to the tapes (so that they may recover after being stretched). Then the teeth may be applied to the compacted tapes that have already been fused with a fusible substrate. In this way, the zipper will be able to stretch the amount compacted and recover an amount depending on the fusible used.

Zippers That Curve

To make zippers that curve according to exemplary embodiments hereof, the zipper tapes are curved, and then the teeth elements are attached to the tapes.

Figure 6A:
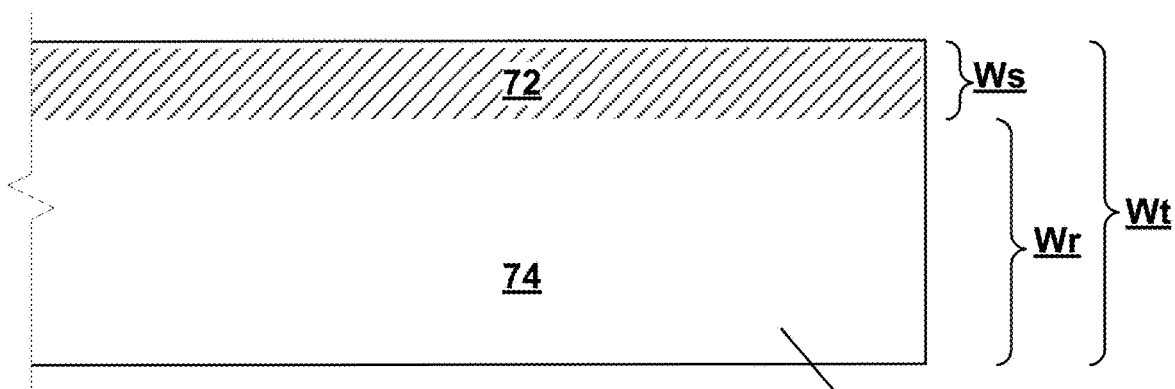

In some cases, e.g., as shown in FIG. 6A, the tape 70 is woven with a self-edge 72 (shaded in the drawing in FIG. 6A) that is tighter than the rest of the tape 74.

The self-edge 72 has a width Ws, and the rest of the tape has a width Wr, where Ws+Wr is the width of the tape Wt. Those of skill in the art will know and understand, upon reading this description, how to select the ratio of Ws to Wr (or of Ws to Wt) to achieve a desired curvature for the zipper.

Figure 6B:
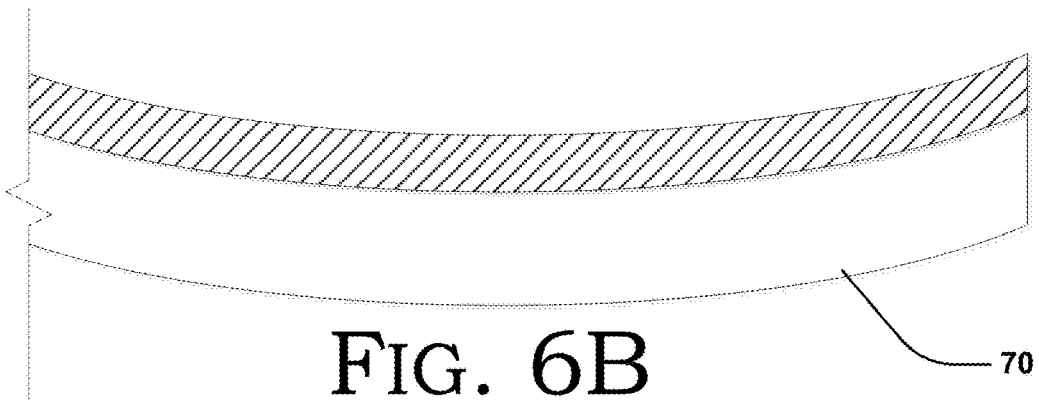

The tape 70 is compacted using a heated compactor. When compacted, the self-edge 72 will compact less than the rest of tape 74. Thus, after compaction, the rest of the tape 74 will open up more than the self-edge 72. This will cause the tape 70 to curve, e.g., as shown in FIG. 6B.

Figure 6C:
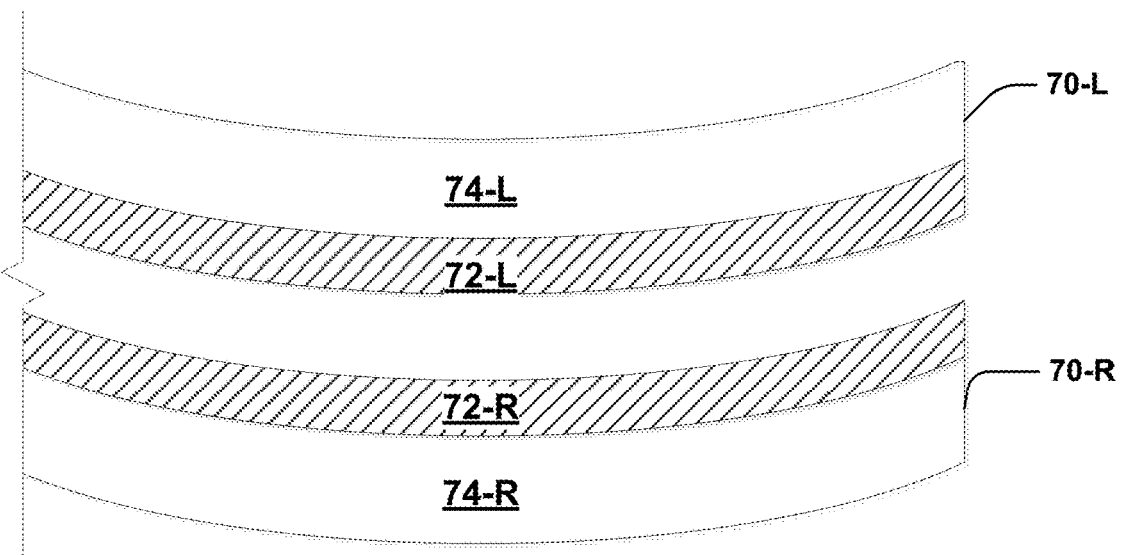
Figure 6D:
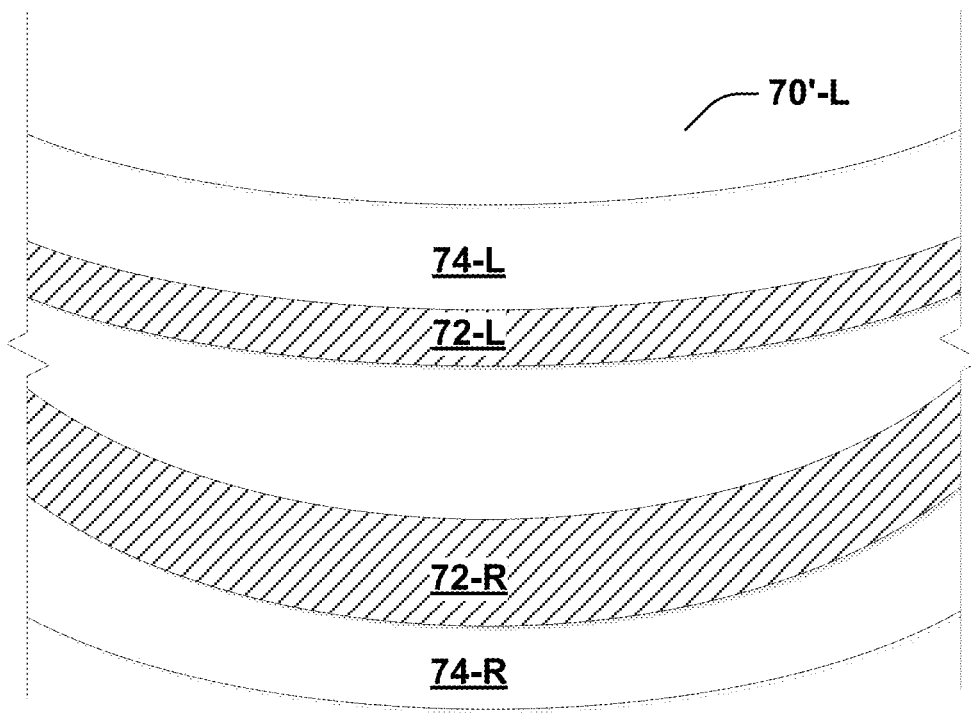

As shown, e.g., in FIGS. 6C-6D, the tapes 70-L, 70-R (and 70'-L) and 70'-R, respectively) for the left and right sides of a zipper should be curved so that the outside edge of one side has tighter compaction than the rest of that side, and, for the other tape side, the inside edge has tighter compaction than the rest of the tape.

Figure 6E:
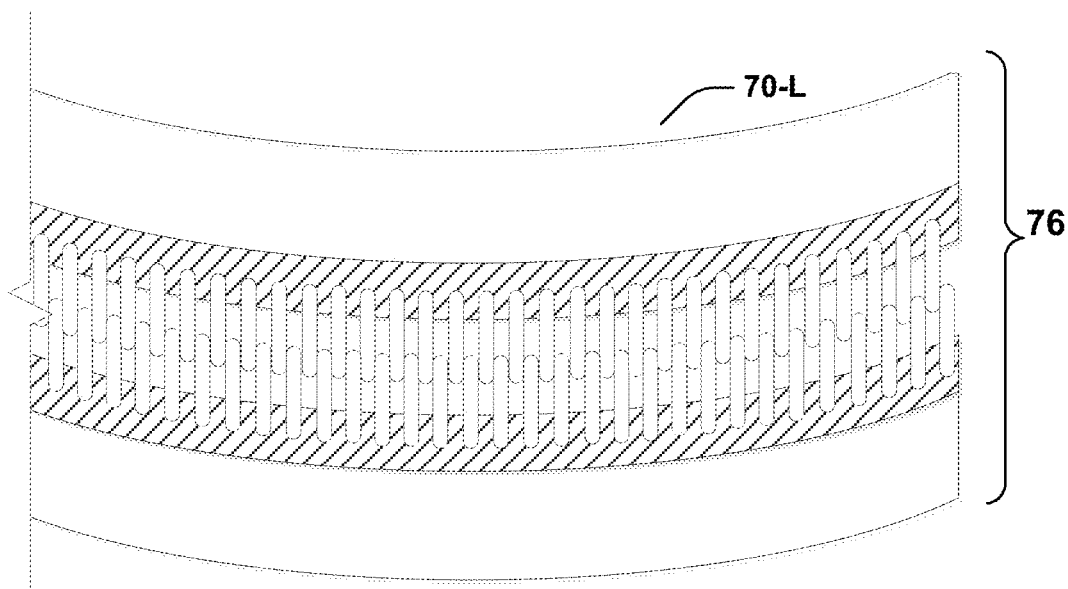

The two curved tapes 70-L, 70-R may then be joined with their teeth, as shown in FIG. 6E, to form a curved zipper 76.

If the tapes 70-L, 70-R are compacted with a drum, the tapes may be done on opposite sides of the drum before being joined with the teeth.

In some cases, the self-edge may have stretch, allowing the curve to stretch. For example, in some implementations, the self-edge of the tape faces the outside of the drum to allow the curve to stretch. Fusible may be added to the self-edge to allow it to stretch and recover.

FIGS. 6A-6E show only a portion of a curved tape or curved zipper. As should be understood, other parts of the zipper may be straight or may also be curved. Different parts of a zipper may have different degrees of curvature. A zipper may have multiple curves. In some cases, tapes with different curvatures may be joined (e.g., sewn together) to form a zipper with multiple curvatures. The two tapes may have been formed or compacted separately. For example, a first zipper with a first curvature may be formed (as described above), and a second zipper with a second curvature may be formed (also as described above), and then a tape from the first zipper (having the first curvature) may be used with a tape of the second zipper (having the second curvature).

Figure 7A:
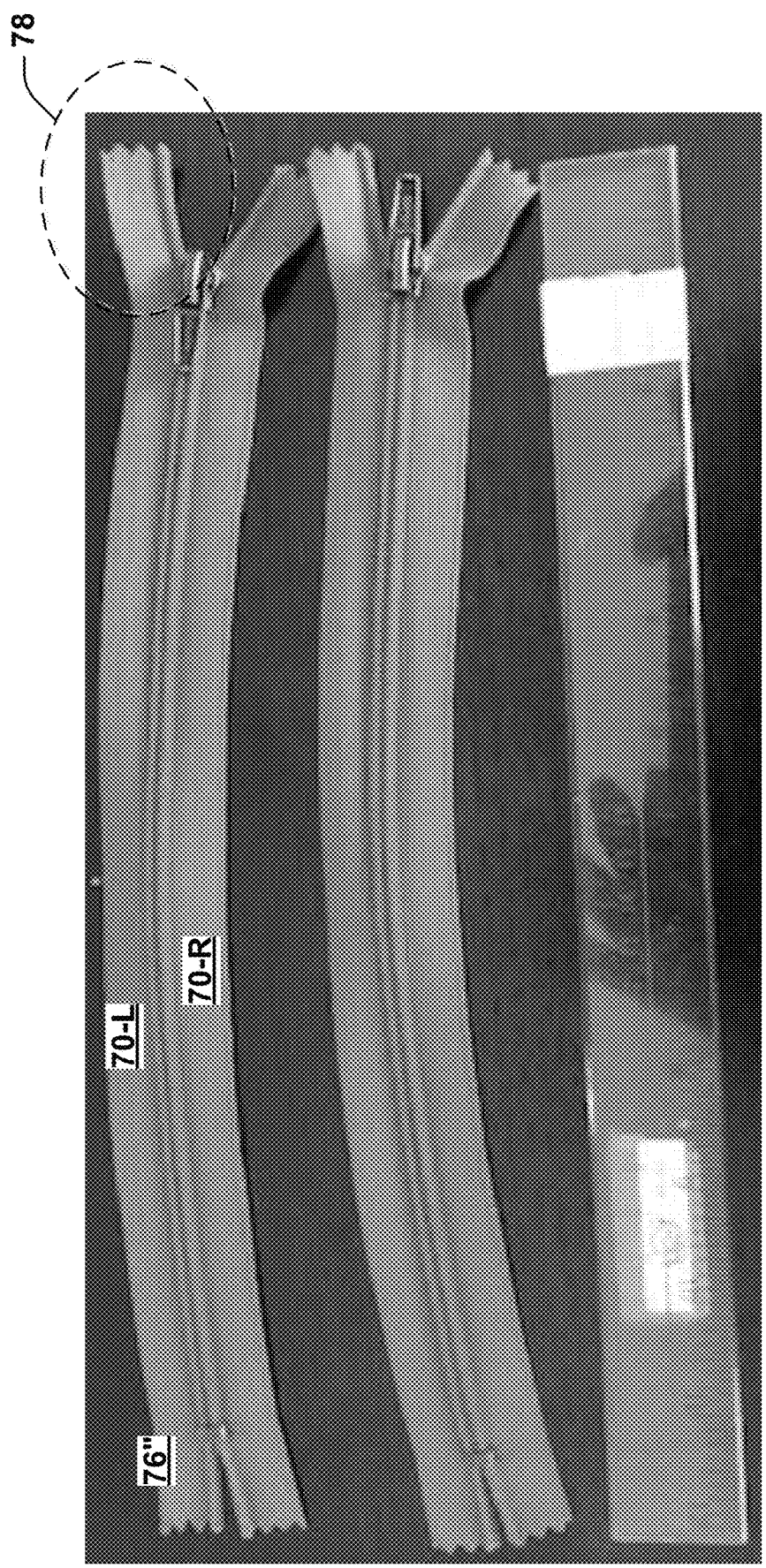
FIGS. 7A-7C are photographs of curved zippers according to exemplary embodiments hereof.
Figure 7B:
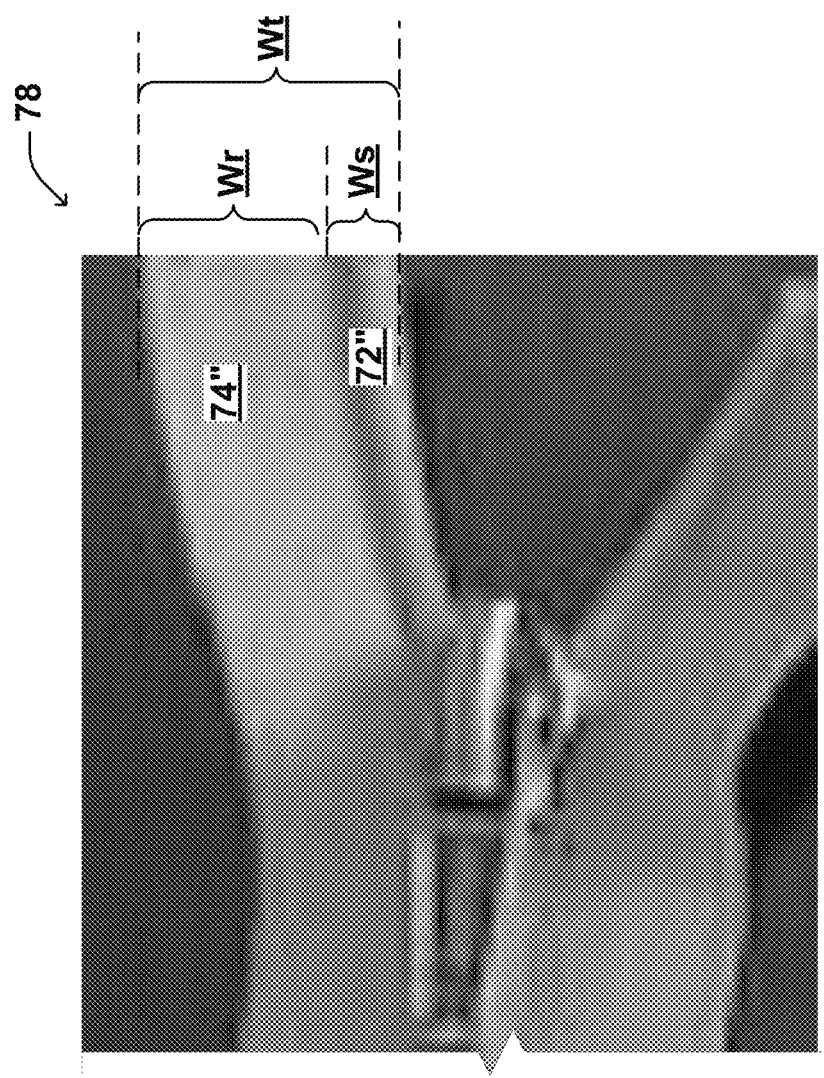
Figure 7C:
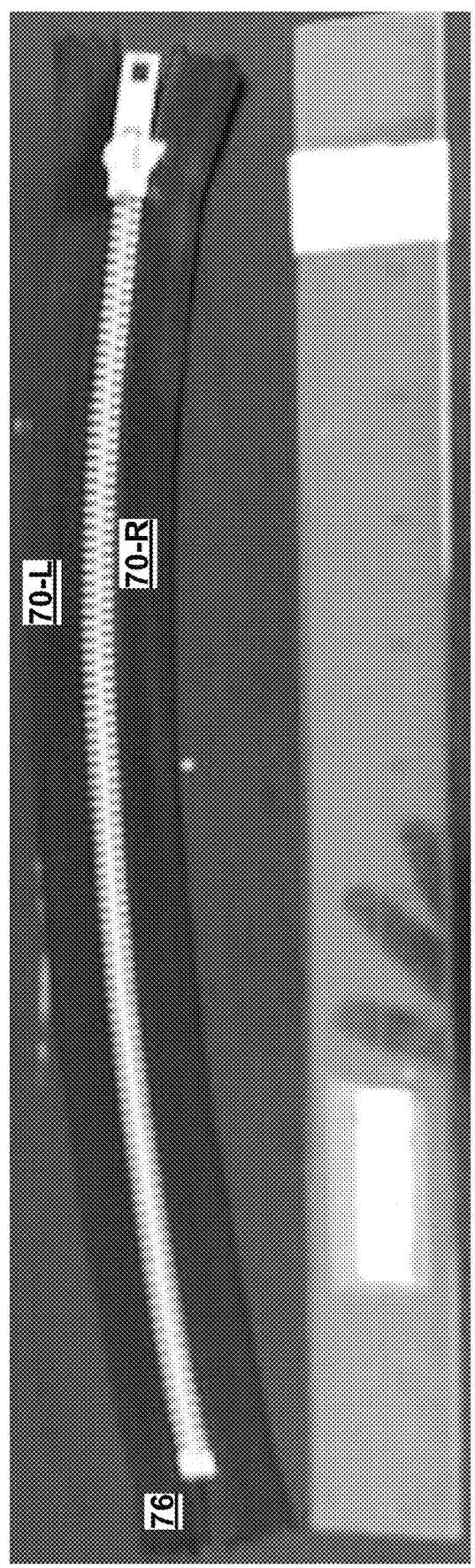

FIGS. 7A-7C are photographs of curved zippers according to exemplary embodiments hereof. FIG. 7B shows aspects of a region 78 of the curved zipper 76" of FIG. 7A. In particular, FIG. 7B shows the regions 72" and 74" on the zipper 76" (corresponding to the regions 72 and 74 in FIG. 6A).

EXAMPLES

FIGS. 7A-7B are photographs of curved zippers according to exemplary embodiments hereof.

An example curved zipper, according to exemplary embodiments hereof, was tested against existing zippers. The results of these tests are summarized in the following table:

| Zipper | Flexibility | Inside Pucker | Strength Reduction |
|---|---|---|---|
| Curved zipper according to exemplary embodiments hereof | Up to 7% | reduced | 5-10% |

-continued

| Zipper | Flexibility | Inside Pucker | Strength Reduction |
|---|---|---|---|
| Zipper with knitted tapes | Up to 5% | Same as regular zip | 20-30% |
| Zipper with stretchable tapes | Up to 10% | Higher than regular zip | 30-50% |
| Zipper with cut tapes | 50% Lateral | Higher than regular zip | 20-30% |

Discussion

Thus are described various zippers, items using the zippers, and methods of making the zippers and the items.

The above description includes description of zippers that deal with too much shrinkage; and/or zippers that deal with too little shrinkage; and/or zippers that stretch; and/or zippers that stretch and recover; and/or zippers that curve. Although exemplary embodiments are described under various headings (e.g., Zippers that deal with too much shrinkage, Zippers that deal with too little shrinkage, Zippers that Stretch, Zippers that Stretch and recover, and Zippers that Curve), these headings are to aid this description and are not intended to limit the scope of any of the embodiments. Those of ordinary skill in the art will realize and appreciate, upon reading this description, that the various embodiments under a given heading are not intended to be exclusive or mutually exclusive and that the various approaches may be combined. For example, a zipper that curves may also have stretch or stretch and recovery properties, and zippers that deal with too little or too much shrinkage may also curve and also stretch and recover.

In addition, when a particular property (e.g., stretch and recovery) is applied to one tape of a zipper assembly, that same approach need not apply to the other tape of the zipper assembly.

Conclusion

As used herein, including in the claims, the phrase "at least some" means "one or more" and includes the case of only one. Thus, e.g., the phrase "at least some ABCs" means "one or more ABCs" and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least" and is not exclusive. Thus, e.g., the phrase "using X" means "using at least X." Unless specifically stated by the use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" and so on in the description and claims are used to distinguish or identify and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A method of making a zipper, the method comprising:
   compacting a first tape to form a compacted first tape having a first degree of compaction;
   compacting a second tape to form a compacted second tape having a second degree of compaction; and
   attaching interlocking elements to the compacted first tape; and
   attaching interlocking elements to the second compacted tape,
   wherein the first degree of compaction is distinct from the second degree of compaction,
   wherein at least a portion of the first tape and at least a portion of the second tape are curved.

2. The method of claim 1, wherein less than the entire zipper is curved.

3. The method of claim 1, wherein the zipper has more than one curve.

4. The method of claim 1, wherein a curve of the first tape was caused, at least in part, by compaction of the first tape.

5. The method of claim 4, wherein a curve of the second tape was caused, at least in part, by compaction of the second tape.

6. The method of claim 1, further comprising:
   after compaction of the first tape, fusing a first fusible substrate to the compacted first tape; and/or
   after compaction of the second tape, fusing a second fusible substrate to the compacted second tape.

7. The method of claim 1, wherein the first tape and the second tape are compacted using a heated drum.

8. The method of claim 1 wherein the first tape is woven with a first edge portion having a tighter weave than the rest of the first tape.

9. The method of claim 1, wherein the first tape is formed as part of a first zipper and the second tape is formed as part of a second zipper.

10. A method comprising:
    providing a first zipper, the first zipper comprising a first tape and a second tape and first interlocking elements attached to the first tape and the second tape;
    providing a second zipper, the second zipper comprising a third tape and a fourth tape and second interlocking elements attached to the third tape and the fourth tape; and
    forming a third zipper from (i) the first tape and a plurality of the first interlocking elements and (ii) the third tape and a plurality of the second interlocking elements,
    wherein at least a portion of the first tape and at least a portion of the third tape are curved,
    wherein a curve of the first tape was caused, at least in part, by compaction of the first tape.

11. The method of claim 10, wherein a curve of the third tape was caused, at least in part, by compaction of the third tape.

12. The method of claim 11, wherein the third tape was compacted using a heated drum.

13. The method of claim 10, wherein less than the entire first tape is curved and less than the entire third tape is curved.

14. The method of claim 10, wherein the third zipper has more than one curve.

15. The method of claim 10, wherein, in the third zipper, a plurality of the first interlocking elements of the first tape interlock with a plurality of the second interlocking elements of the third tape.

16. The method of claim 10, wherein the first tape was compacted using a heated drum.

17. A method comprising:
    making a first zipper, the first zipper comprising a first tape and a second tape and first interlocking elements attached to the first tape and the second tape;
    making a second zipper, the second zipper comprising a third tape and a fourth tape and second interlocking elements attached to the third tape and the fourth tape; and
    forming a third zipper from the first tape and a plurality of the first interlocking elements and the third tape and a plurality of the second interlocking elements,
    wherein at least a portion of the first tape and at least a portion of the third tape are curved,
    wherein a curve of the first tape was caused, at least in part, by compaction of the first tape, and
    wherein a curve of the third tape was caused, at least in part, by compaction of the third tape.

18. The method of claim 17, wherein less than the entire first tape is curved and less than the entire third tape is curved.

19. The method of claim 17, wherein the third zipper has more than one curve.

20. The method of claim 17, wherein at least the first tape and the third tape are compacted using a heated drum.

21. The method of claim 17, further comprising:
    after compaction of the first tape, fusing a fusible substrate to the first tape.

22. The method of claim 21, further comprising:
    after compaction of the third tape, fusing a fusible substrate to the third tape.

* * * * *